(12) United States Patent
Worden

(10) Patent No.: US 11,566,692 B2
(45) Date of Patent: Jan. 31, 2023

(54) ACTUATOR FOR SOLAR PANELS

(71) Applicant: Gamechange Solar Corp., Norwalk, CT (US)

(72) Inventor: Andrew Barron Worden, Redding, CT (US)

(73) Assignee: Gamechange Solar Corp., Norwalk, CT (US)

( * ) Notice: Subject to any disclaimer, the term of this patent is extended or adjusted under 35 U.S.C. 154(b) by 0 days.

(21) Appl. No.: 17/536,356

(22) Filed: Nov. 29, 2021

(65) Prior Publication Data

US 2022/0196124 A1 Jun. 23, 2022

Related U.S. Application Data

(60) Provisional application No. 63/119,838, filed on Dec. 1, 2020.

(51) Int. Cl.
| | | |
|---|---|---|
| *F16H 25/20* | (2006.01) | |
| *F16H 57/031* | (2012.01) | |
| *F16H 57/027* | (2012.01) | |
| *F16H 57/029* | (2012.01) | |
| *H02S 20/32* | (2014.01) | |
| *F16H 57/02* | (2012.01) | |

(52) U.S. Cl.
CPC ............ *F16H 25/20* (2013.01); *F16H 57/027* (2013.01); *F16H 57/029* (2013.01); *F16H 57/031* (2013.01); *H02S 20/32* (2014.12); *F16H 2025/204* (2013.01); *F16H 2025/2031* (2013.01); *F16H 2025/2081* (2013.01); *F16H 2057/02034* (2013.01); *F16H 2057/02069* (2013.01)

(58) Field of Classification Search
CPC . F16H 2057/02069; F16H 2057/02034; F16H 2025/2081; F16H 2025/204; F16H 2025/2031; F16H 57/031; F16H 57/029; F16H 57/027; F16H 25/20
See application file for complete search history.

(56) References Cited

U.S. PATENT DOCUMENTS

| | | | | |
|---|---|---|---|---|
| 2012/0125399 | A1* | 5/2012 | Schatz | H02S 20/32 |
| | | | | 136/246 |
| 2017/0063288 | A1* | 3/2017 | Schuit | F24S 25/632 |
| 2020/0373878 | A1* | 11/2020 | Smith | F16H 25/20 |
| 2022/0090658 | A1* | 3/2022 | Dickson | F16H 25/2015 |
| 2022/0196124 | A1* | 6/2022 | Worden | F16H 57/027 |

* cited by examiner

*Primary Examiner* — David M Fenstermacher

(57) ABSTRACT

An actuator assembly for a solar tracking system. The actuator assembly includes a gearbox housing and a gearbox cover, a motor, and a lead screw. The gearbox housing and gearbox cover cooperate to define an internal chamber for receiving a gear assembly. The motor is mounted to the gearbox housing and is operatively connected to the gear assembly. The lead screw is operatively attached to the gear assembly and mounted inside an inner tube. A thrust bearing assembly is disposed between the gear assembly and the lead screw, with a portion of a thrust bearing nut being positioned within the thrust bearing assembly. A castle nut engages the thrust bearing nut, with the locking washer being frictionally engaged with the castle nut in an interlocking manner. An inner tube is mounted with in an outer tube for linear movement with respect to the outer tube.

8 Claims, 12 Drawing Sheets

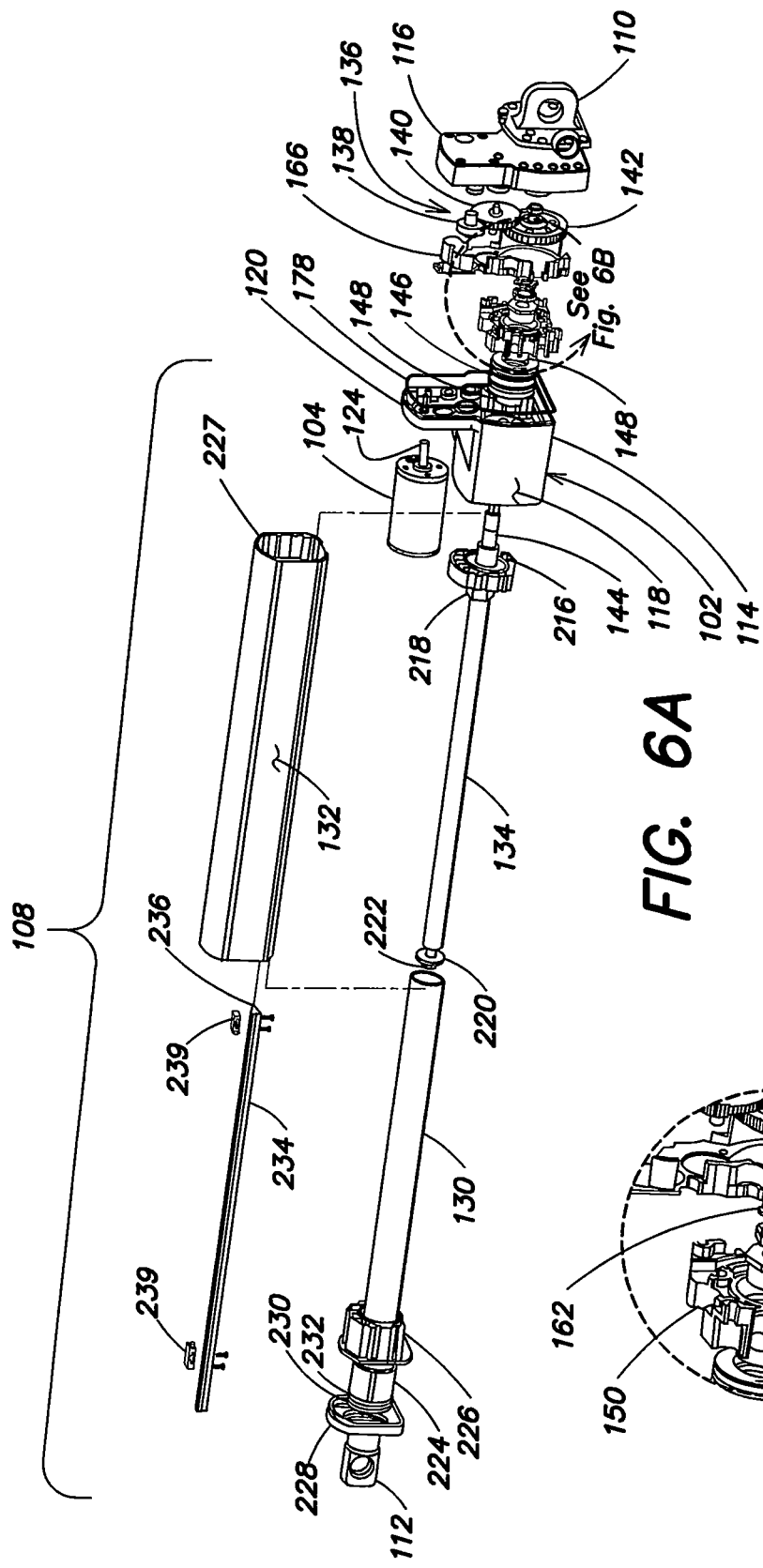
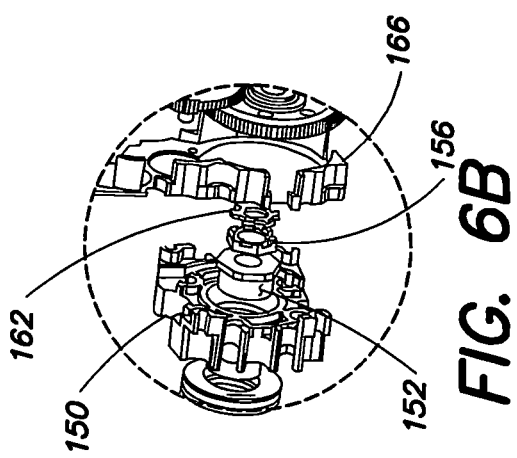
FIG. 6A
FIG. 6B

ACTUATOR FOR SOLAR PANELS

CROSS REFERENCE TO RELATED APPLICATIONS

This application claims the benefit of U.S. Provisional Patent Application Ser. No. 63/119,838 filed Dec. 1, 2020, which is hereby incorporated by reference.

BACKGROUND OF THE INVENTION

1. Technical Field

The present disclosure relates generally to solar panel arrangements and more specifically to an actuator for use with solar panel arrangements.

2. Background Information

Solar cells and solar panels are most efficient in sunny conditions when oriented towards the sun at a certain optimal angle. Many solar panels systems are designed in combination with solar trackers, which follow the sun's trajectory to maximize the electrical generation capabilities of the systems. Linear actuator systems are often utilized to adjust the tilt angle of the solar panels to achieve the desired positioning of the solar panel.

However, known linear actuator systems have certain deficiencies that compromise their effectiveness. For example, one issue that adversely impacts the operation of linear actuator systems is unintentional movement of a thrust bearing assembly. More specifically, while a conventional thrust nut is typically used to position and hold the thrust bearings and a secondary nut is used to further secure against movement, sometimes the secondary nut gets loose during operation of the actuator and allows movement of the thrust nut and the thrust bearings, which may compromise the operation.

Further, because linear actuator systems are used outside, the environment can often play a role in adversely affecting the operation of actuator systems. For example, the operation of the thrust bearings can create a vacuum effect, which may cause vapor to be drawn into the actuator system, especially in rainy and humid conditions, thereby resulting in internal condensation. Such condensation may lead to deterioration of the internal components of the actuator system.

Another issue that occurs with known linear actuators is potential damage to various components within the linear actuator due to the rotation of the gears. For example, chaffing and exposure of wires may occur within the gearbox from the rotation of the gears. Further, as grease is often liberally applied to the gears to aid in their movement, due to the location of the motor being adjacent the gear arrangements, a pathway may be formed for the grease to enter the motor, leading to its failure.

A further issue that can lead to failure or malfunction of a linear actuator is failure of a gasket seal between the gearbox and the gearbox cover. While the gearbox and gearbox cover are often joined together in a complementary manner to close off the internal space within the gearbox, if the compressive force between the two elements is too great, the seal created by the gasket seal may be compromised. Further, the gasket seal may inadvertently move during operation, which can also lead to sealing failure.

Accordingly, an improved actuator that addresses one or more of the above deficiencies is warranted.

SUMMARY OF THE DISCLOSURE

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

According to an aspect of the disclosure, an actuator assembly comprises a gearbox assembly including a gearbox housing and a gearbox cover, the gearbox housing defining an internal chamber for receiving a gear assembly; a motor mounted to the gearbox housing and operatively connected to the gear assembly; a lead screw operatively attached to the gear assembly and mounted inside an inner tube; a thrust bearing assembly disposed between the gear assembly and the lead screw, within the gearbox housing, with a portion of a thrust bearing nut being positioned within the thrust bearing assembly; a castle nut engaging against the thrust bearing nut, the castle nut including at least one groove member formed in an end face thereof; a locking washer having at least one cooperating tab element that is sized and shaped to be received within the groove member of the castle nut; and wherein the inner tube is mounted within an outer tube for linear movement with respect to the outer tube.

The castle nut may include a plurality of grooves that are spaced apart equi-distance from one another.

The locking washer may include a plurality of cooperating tab elements that are spaced apart equi-distance from one another.

The gearbox cover may further include a two-way air vent disposed therethrough.

The gearbox housing may further include a second two-way air vent disposed therethrough.

The second two-way air vent may be spaced from the thrust bearing assembly, downstream of the motor.

The actuator assembly may include a sealing gasket positioned between the gearbox housing and the gearbox cover, along an inner periphery thereof.

The gearbox cover may include a groove that is spaced inwardly from an outer edge of an outer periphery of the gearbox cover, wherein the groove has a defined depth and width that is less than the height and thickness of the sealing gasket when in an uncompressed configuration such that when the gearbox cover and the gearbox housing are joined, the sealing gasket is compressed within the groove, while maintaining a seal between the gearbox cover and the gearbox housing.

BRIEF DESCRIPTION OF THE DRAWINGS

FIG. 6A is an exploded view of the actuator assembly of FIG. 1;

FIG. 6B is an enlarged view of encircled area 6B from FIG. 6A;

DETAILED DESCRIPTION

Figure 1:
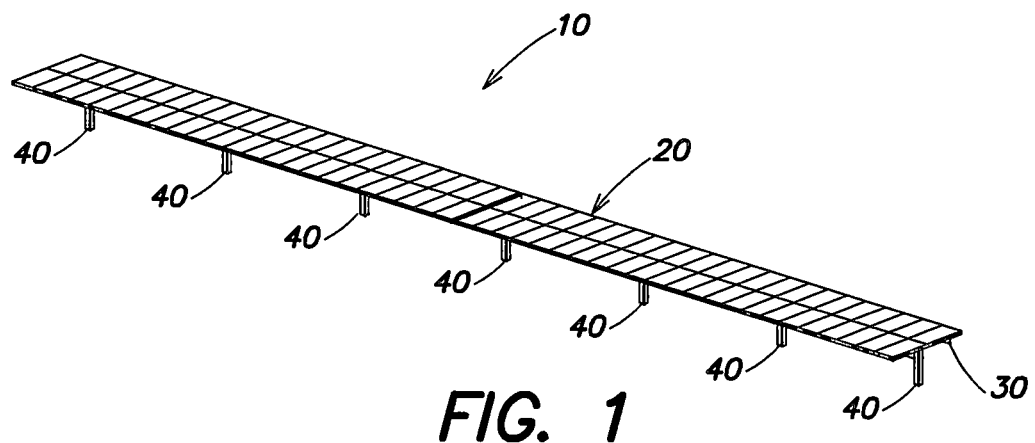
FIG. 1 is a perspective view of a solar panel arrangement.

Referring now to the discussion that follows and also to the drawings, illustrative approaches to the disclosed devices are shown in detail. Although the drawings represent some possible approaches, the drawings are not necessarily to scale and certain features may be exaggerated, removed, or partially sectioned to better illustrate and explain the present disclosure. Further, the descriptions set forth herein are not intended to be exhaustive or otherwise limit or restrict the claims to the precise forms and configurations shown in the drawings and disclosed in the following detailed description.

Figure 2:
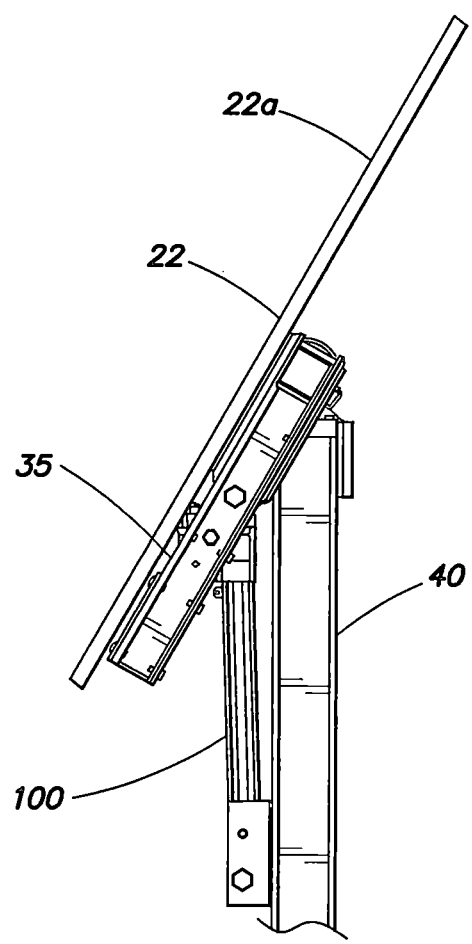
FIG. 2 is an elevational view of a support bracket with an actuator assembly for use with a solar panel arrangement.
Figure 3:
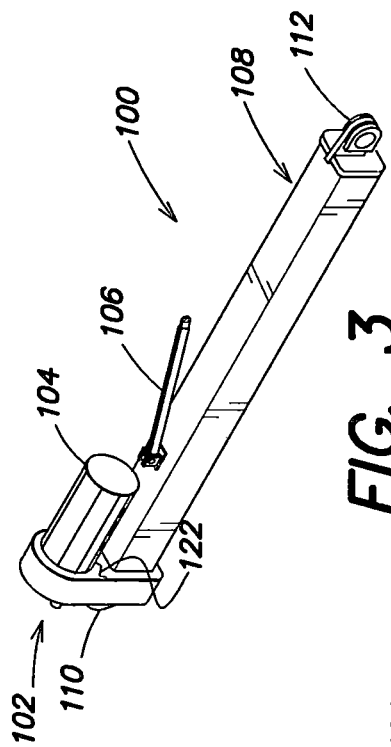
FIG. 3 is a perspective view of an exemplary arrangement of an actuator assembly for use with a solar panel arrangement.

With reference to FIGS. 1-2, an exemplary solar panel arrangement 10 that allows for tracking the location of the sun is illustrated. The solar panel arrangement 10 includes a solar array 20, a support structure 30 that includes a drive arm 35 that is configured to support the solar array 20, one or more support brackets 40, and an actuator assembly 100 (FIG. 3) that is configured to articulate the drive arm 35, and therefore the solar array 20 relative to the support brackets 40. The solar array 20 includes at least one photovoltaic module 22. Each module 22 may be mechanically and electrically coupled to one another module. Alternatively, each module 20 may be mechanically and/or electrically insulated from one another. The photovoltaic modules 22 may be any suitable photovoltaic module capable of generating electrical energy from sunlight, such as monocrystalline silicon, polycrystalline silicon, thin-film, etc. An upper surface 22a of the photovoltaic modules 22 include photovoltaic cells.

Referring to FIGS. 3-18, details of the actuator assembly 100 will now be described. The actuator assembly 100 comprises a gearbox assembly 102, a motor 104, a jumper 106, and an articulation assembly 108. Secured to a motor end of the actuator assembly 100 is a first connection member 110. A second connection end 112 is connected to an end of the articulation assembly 108.

The gearbox assembly 102 includes a gearbox housing 114, which houses various gears, to be explained in further detail below, and a gearbox cover 116 (FIG. 6A). In one exemplary configuration, the gearbox housing 114 includes an actuation section 118 and a motor mount section 120 that extends upwardly from the actuation section 118. The gearbox cover 116 is configured to mate with and close off the actuation section 118 and the motor mount section 120. The first connection member 110 is fixedly connected to the gearbox cover 116.

The motor 104 is mounted to a front face 122 (best seen in FIG. 5) of gearbox assembly 102. A driveshaft 124 (best seen in FIG. 6A) extends from the motor 104, into the motor mount section 120 of the gearbox housing 114. In one exemplary arrangement, the motor 104 is 24V DC, 140-160W.

The jumper 106 may be a braided jumper. Each end of the jumper 106 includes a connection member 126a, 126b. In one exemplary arrangement, an outer surface of the articulation assembly 108 includes a mating connection member 128 (best seen in FIG. 5) that cooperates with connection member 126a of the jumper 106 to connect the jumper thereto.

Referring to FIGS. 6A-6B, details of the articulation assembly 108 will now be discussed. The articulation assembly 108 comprises an inner tube 130, an outer tube 132, a lead screw 134, and a gear assembly 136. The gear assembly 136 further comprises a motor gear 138, a transfer gear 140 and a drive gear 142. The driveshaft 124 of the motor 104 is operatively connected to the motor gear 138. The motor gear 138 is operatively connected to the transfer gear 140 and the transfer gear 140 is operatively connected to the drive gear 142. A shaft 144 extending from the lead screw 134 is operatively connected to the drive gear 142.

Figure 9:
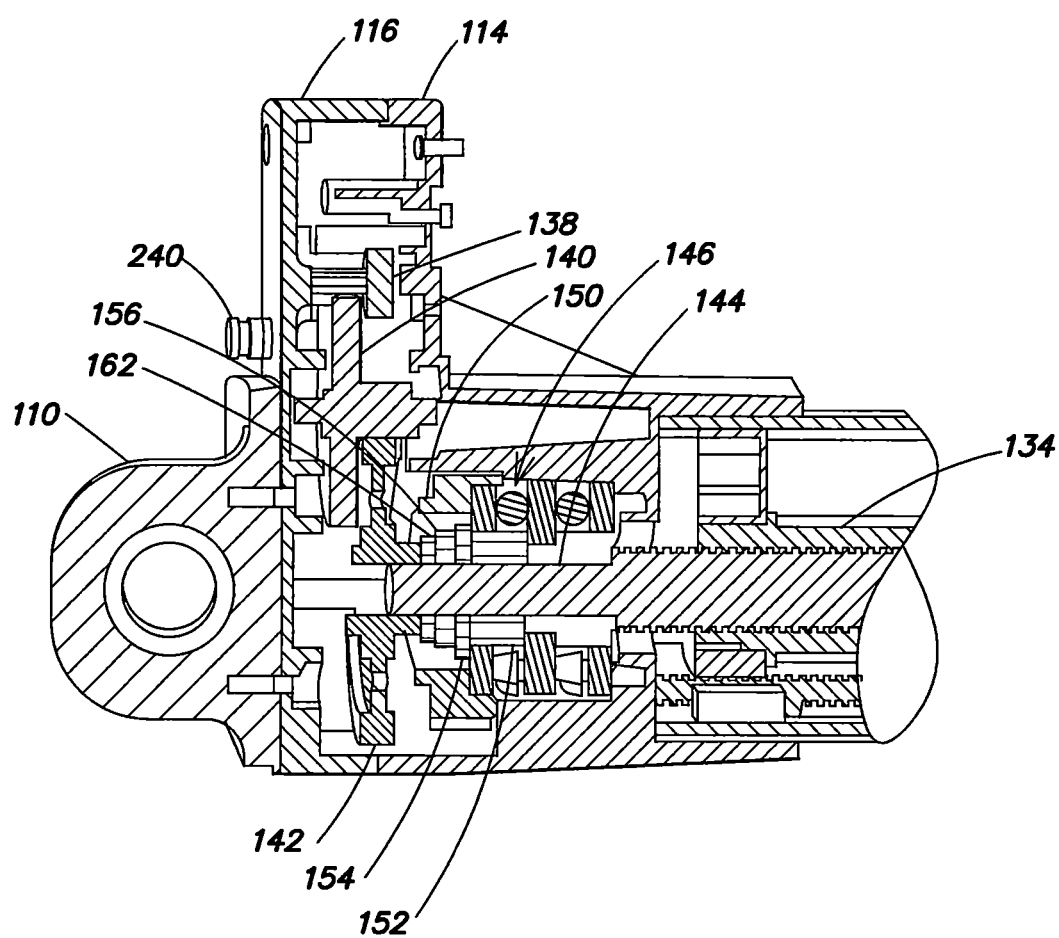
FIG. 9 is a partial cross-sectional view of the motor end of the actuator assembly of FIG. 1.
Figure 10:
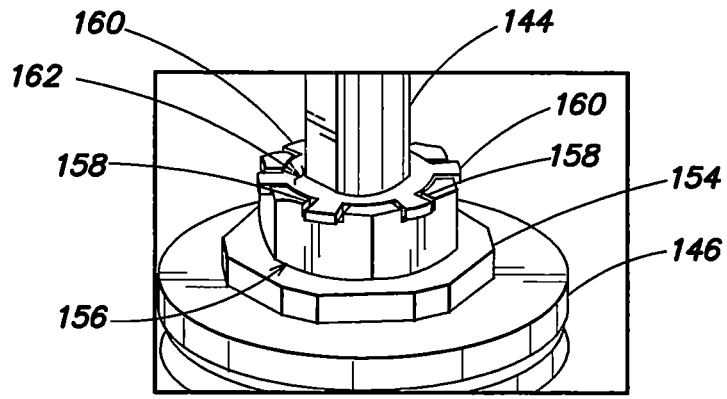
FIG. 10 is an enlarged perspective view of a thrust bearing arrangement.

Disposed between the drive gear 142 and the lead screw 134 (and disposed within the gearbox housing 114) is a thrust bearing assembly 146 and a pair of bushings 148. A fixed plate 150 is fitted within the gearbox housing 114 with an opening into which the thrust bearing assembly 146 is positioned. A thrust bearing nut 152 is positioned within the thrust bearing assembly 146, with a flange 154 thereof engaging against an outer surface of the thrust bearing assembly 146, as best seen in FIGS. 9 and 10. Engaged against the thrust bearing nut 152 is a castle nut 156. The castle nut 156 includes at least one groove 158, and in one exemplary arrangement, a plurality of spaced apart grooves 158, disposed in one surface thereof. The spaced apart grooves 158 are configured to receive cooperating tab elements 160 of a locking washer 162, as best seen in FIG. 10. The locking washer 162 abuts the drive gear 142, as best seen in FIG. 9. The thrust bearing nut 152 is used to position and hold the thrust bearings 146 in position. The castle nut 156 holds the thrust bearing nut 152 in position. The interlocking nature of the grooves 158 of the castle nut 156 and the tab elements 160 of the locking washer 162 serve to prevent inadvertent dislodgement of the thrust bearing nut 152, which would allow movement of the thrust bearing nut 152 and thrust bearings 146, thereby compromising the positioning of the lead screw 134 and operation of the actuator assembly 100.

Figure 11:
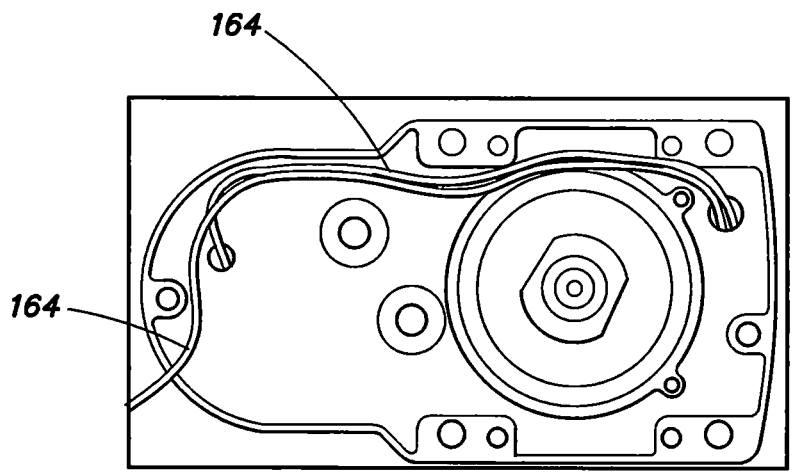
FIG. 11 is a plan view of a mount surface of the motor end of the actuator assembly of FIG. 1, illustrating the positioning of operational wires.
Figure 12:
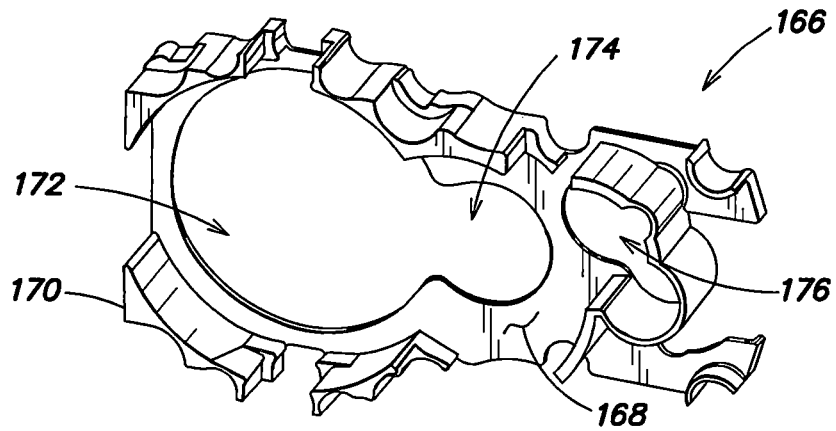
FIG. 12 is a perspective view of a separator for the actuator assembly of FIG. 1.
Figure 13:
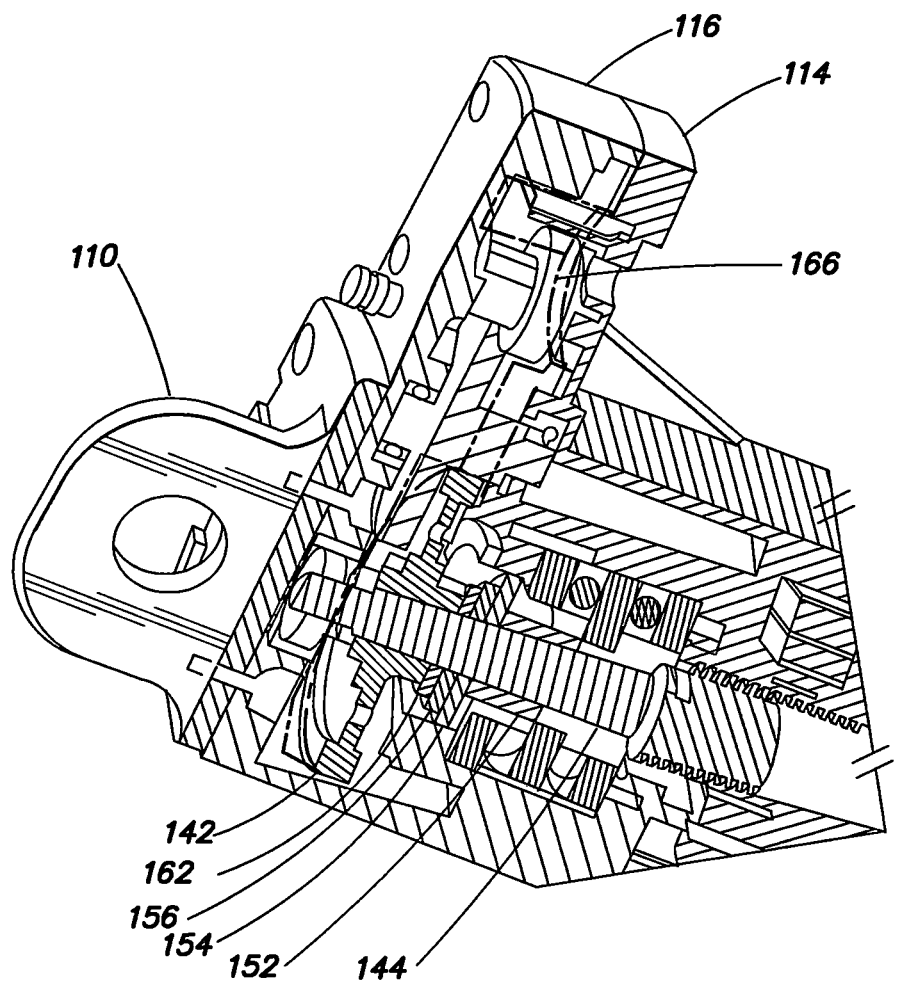
FIG. 13 is a cross-sectional view of the motor end of the actuator assembly of FIG. 1, illustrating the positioning of the separator within the motor end of the actuator assembly.
Figure 14:
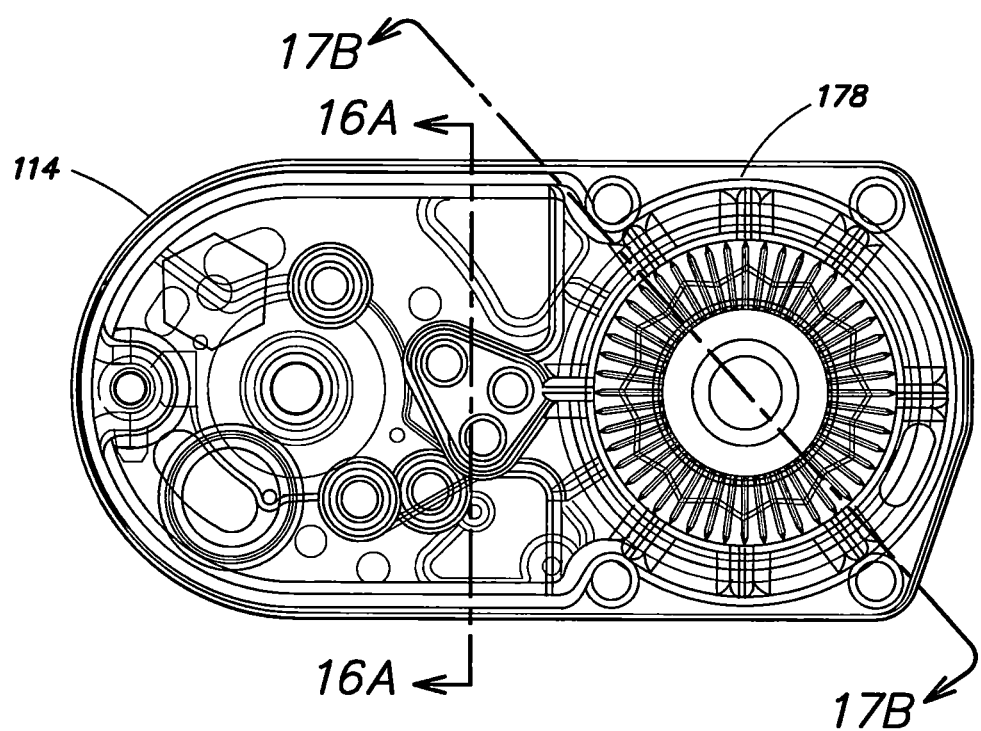
FIG. 14 is a plan view of a gearbox of the actuator assembly illustrating the positioning of a sealing gasket.

Referring to FIG. 11, there are a number of wires 164 that power the actuator assembly 100. The wire 164 are generally fixed in a set location within the gearbox housing 114. However, when the gear assembly 136 is mounted in the gearbox housing 114, there is a danger that the wires 164 may be inadvertently chaffed and exposed due to their proximity to the rotating gears. Such chaffing or exposure may lead to short-circuits in the operation of the actuator assembly 100, or leeching of amperage. To prevent such action, a separator 166 (best seen in FIG. 12) is provided.

The separator 166 generally has a shape that is complementary to the shape of the gearbox housing 114 and may be constructed of a plastic material such that the little weight is added to the actuator assembly 100. The separator 166 is defined by an engagement face 168 and an outwardly extending wall 170 that extends partially about the periphery of the engagement face 168. Disposed through the engagement face 168 is a first opening 172. In one exemplary arrangement, the first opening 172 overlaps partially with a smaller second opening 174. At least a third opening 176 is also disposed through the engagement face 168. The walls 170 may be constructed with complementary elements that frictionally engage with elements on the fixed plate 150 to lock the separator 166 in position within the gearbox housing 114.

The separator 166 is positioned with the engagement face 168 oriented toward the gearbox housing 114, with the first opening 172 being generally aligned with the thrust bearing assembly 146. The third opening 176 is generally aligned with the driveshaft 124 of the motor 104. In this manner, the wall 170 extends toward the gearbox cover 116, with the gear assembly 136 being disposed between the engagement face 168 and the gearbox cover 116. The first opening 172 is sized to accommodate the drive gear 142. The third opening 176 is sized to accommodate the motor gear 138. With this arrangement, the gear teeth of the gear assembly 136 are generally enclosed and separated from the wires 164, thereby reducing the likelihood of the wires 164 becoming chaffed or exposed by the turning gears.

Further, grease is often liberally applied to aid in the movement of gears 138, 140, and 142. Further, as the motor 104 is adjacent to the gearbox housing 114, grease may inadvertently flow into the motor, which can cause damage to the operation of the motor. The separator 166 will also create a barrier to protect against such inadvertent movement of the grease into the motor 104.

Referring to FIGS. 14-18, the actuator assembly 100 further comprises a sealing gasket 178 that may be used to seal the gearbox housing 114 and the gearbox cover 116, when joined. The sealing gasket 178 has a shape that generally corresponds to an inner periphery of the gearbox housing 114. Generally, the gearbox housing 114 and the gearbox cover 116 are compressed together by hardware torque (i.e., fasteners) with the gasket 178 compressed therebetween to effect a seal between the gearbox housing 114 and the gearbox cover 116. However, all sealing gaskets 178 have a predetermined compressive force threshold where the force effects an optimum seal for the gasket 178. Thus, if the compressive force between the gearbox housing 114 and the gearbox cover 116 exceeds the predetermined compressive force threshold, or if undue movement between the mating gearbox housing 114 and gearbox cover 116 occurs, the seal created by the sealing gasket 178 may break.

Figure 16A:
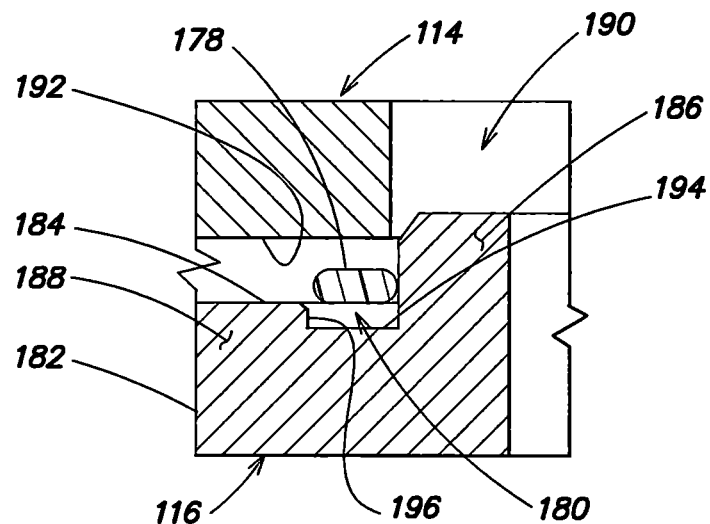
FIG. 16A is a cross-sectional view of the sealing gasket in an uncompressed position, when the gearbox is unassembled, taken along lines 16A-16A of FIG. 14.
Figure 17A:
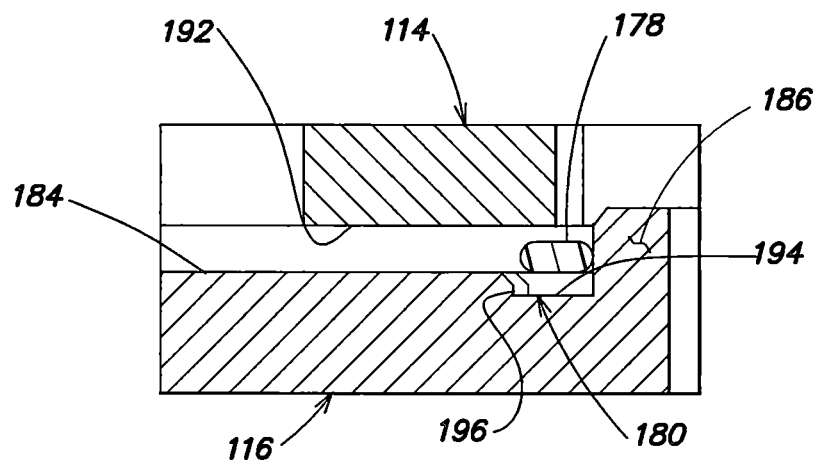
FIG. 17A is a cross-sectional view of the sealing gasket in an uncompressed position, when the gearbox is unassembled in accordance with the arrangement shown in FIG. 16A and taken along lines 17B-17B of FIG. 14.
Figure 17B:
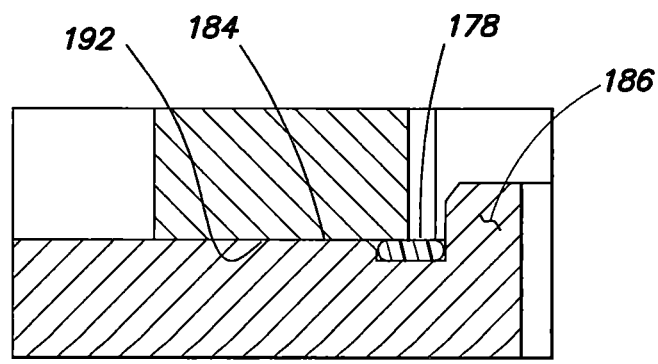
FIG. 17B is a cross-sectional view of the sealing gasket in a compressed position, when the gearbox is assembled in accordance with the arrangement shown in FIG. 16A and taken along lines 17B-17B of FIG. 14.

To prevent damage to the sealing gasket 178 and thus failure of the sealing force imparted by the sealing gasket 178, in one exemplary arrangement, a groove 180 is defined in the gearbox cover 116. The groove 180 is formed spaced inwardly from an outer edge of an outer periphery 182 of the gearbox cover 116 and generally follows the contours of the outer periphery 182. In one exemplary arrangement, an end face 184 of the gearbox cover 116 includes an extending portion 186 and a recessed portion 188. The gearbox housing 114 includes an engagement opening 190 formed through a mating surface 192. The groove 180 is disposed adjacent to the extending portion 186 and extending into the end face 184 of the recessed portion 188. In one exemplary arrangement the groove 180 is defined by a bottom surface 194, side surfaces 196 and the surface of the extending portion 186. The side surfaces 196 may be configured to flare outwardly such that the width of the groove 180 between the side surfaces 196 and the extending portion 186 is greater at the end face 184 than the width of the groove 180 between the side surfaces 196 and the extending portion 186 at the bottom surface 194, as best seen in FIGS. 16A and 17A. The depth of the groove 180 is less than the thickness of the sealing gasket 178 when the sealing gasket 178 is in an uncompressed configuration. The width of the groove 180, even at the bottom surface 194, is less than the width of the sealing gasket 178 when the sealing gasket 178 is in an uncompressed configuration.

Figure 15:
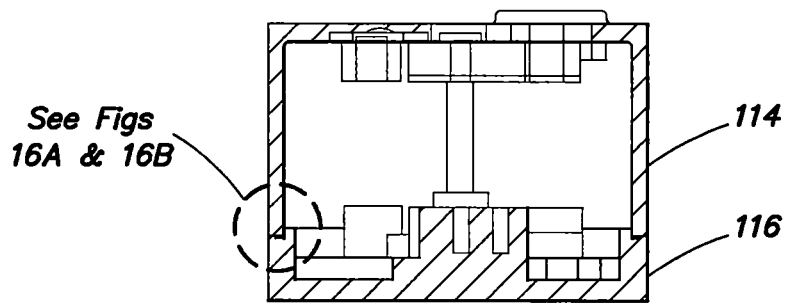
FIG. 15 is a top view of the gearbox in an assembled configuration.
Figure 16B:
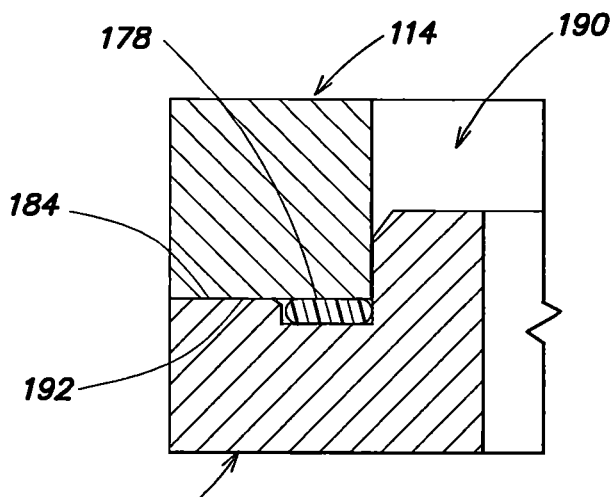
FIG. 16B is a cross-sectional view of the sealing gasket in a compressed position, when the gearbox is assembled, taken along lines 16A-16A of FIG. 14.

Referring to FIGS. 15 and 16B, when the gearbox housing 114 and the gearbox cover 116 are joined together, the extending portion 186 is received within the engagement opening 190 of the gearbox housing 114 and the two elements are moved together resulting in the engagement between the end face 184 and the mating surface 192 with the sealing gasket 178 compressed within the groove 180, thereby preventing inadvertent movement of the sealing gasket 178 during operation of the actuator assembly 100. Moreover, the size of the groove 180 limits the compressive force that may be acted on the sealing gasket 178 to prevent over compression and thereby prevent failure of the sealing effect of the sealing gasket 178. The end face 184 of the gearbox cover 116 thus engages with the mating surface 192 of the gearbox housing 114, with the sealing gasket 178 effecting a seal therebetween, but limiting the amount of compression of the sealing gasket 178.

Figure 18A:
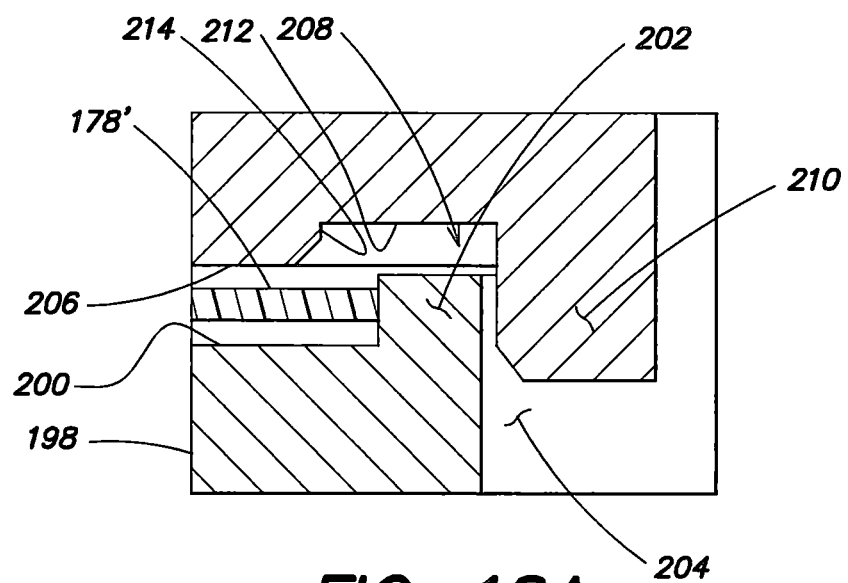
FIG. 18A is a cross-sectional view of the sealing gasket in an uncompressed position, when the gearbox is unassembled in accordance with an alternative arrangement.
Figure 18B:
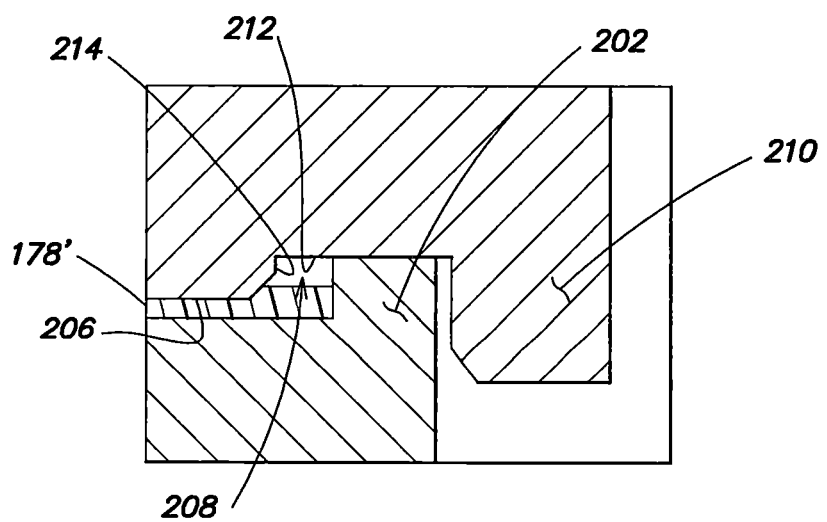
FIG. 18B is a cross-sectional view of the sealing gasket in a compressed position, when the gearbox is assembled in accordance with the alternative arrangement shown in FIG. 18A.

An alternative arrangement of a sealing gasket 178' is shown in FIGS. 18A-18B. In this arrangement, the gearbox cover 116 is defined with a stepped inner periphery 198, defined by an end face 200 and an extending portion 202. Defined within the extending portion 202 is an engagement opening 204. The gearbox housing 114 includes a mating surface 206, a groove 208 and an extending portion 210. The groove 208 is positioned between mating surface 206 and the extending portion 210.

The groove 208 is defined by bottom surface 212, three side surfaces 214 and a surface of the extending portion 210. The side surfaces 214 may be configured to flare outwardly such that the width of the groove 208 between the side surfaces 214 and the extending portion 210 is greater at the mating surface 206 than the width of the groove 208 between the side surfaces 214 and the extending portion 210 at the bottom surface 212, as best seen in FIG. 18A. The groove 208 has a width that is longer than the width of the extending portion 202.

Referring to FIG. 18B, when the gearbox cover 116 is joined to the gearbox housing 114, the extending portion 210 of the gearbox housing 114 is received within the engagement opening 204 of the gearbox cover 116, while the extending portion 202 of the gearbox cover 116 is received within the groove 208. The sealing gasket 178' has a width sufficient long enough to overlap with a portion of the groove 208, with the remainder overlying the mating surface 206 of the gearbox housing 114 and the end face 200 of the gearbox cover 116. Thus, when the gearbox cover 116 is joined to the gearbox housing 114, a first portion of the sealing gasket 178' is pinched between the mating surface 206 and the end face 200, while a second portion is disposed partially within the groove 208 with the extending portion 202 of the gearbox cover. In this manner, if the first portion of the sealing gasket 178' were to fail, the second portion of the sealing gasket 178' that flows into the groove 208, will still provide a seal and therefore prevent water and debris from entering to the motor 104.

Figure 4A:
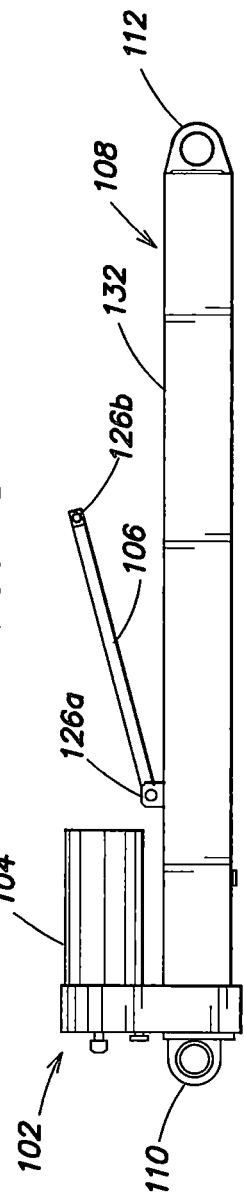
FIG. 4A is a side elevational view of the actuator assembly of FIG. 1 in a first operational position.
Figure 4B:
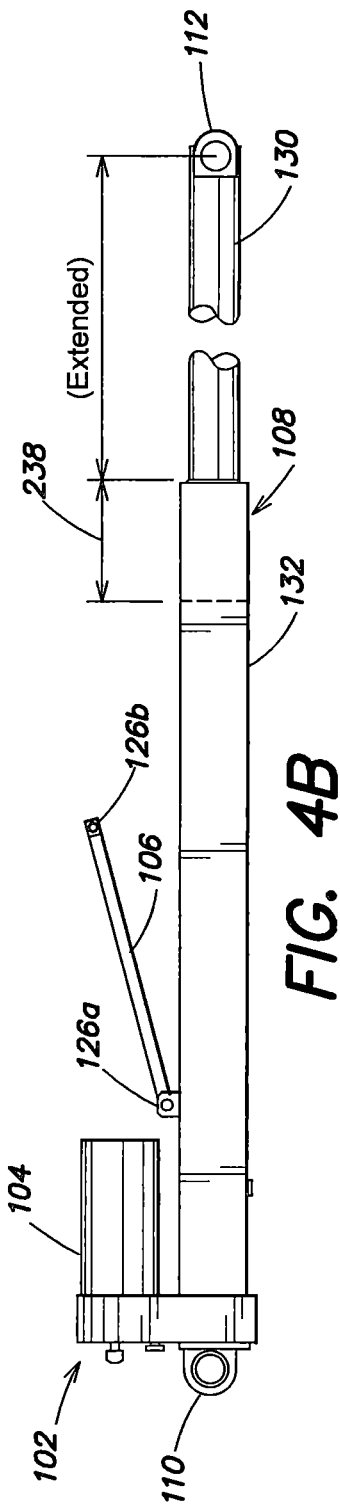
FIG. 4B is a side elevational view of the actuator assembly of FIG. 1 in a second operational position.

Referring to FIG. 6A and FIGS. 4A-4B, further details of the articulation system 108 will now be discussed. The shaft 144 is connected to the lead screw 134 such that rotation of the shaft 144 via the motor-driven gear assembly 136 rotates the lead screw 134. The lead screw 134 includes a guide feature 216 and a nut 218 secured thereto. A plate 220 is secured to the end of the lead screw 134 by a locking nut 222. The lead screw 134 is disposed within the inner tube 130. A support sleeve 224 is disposed over the inner tube 130 and is positioned within a support member housing 226. A support member cover 228 with sealing elements 230, 232 enclose the support sleeve 224. The second connection end 112 is engaged with the support member cover 228.

A slotted rail 234 is fixed within the outer tube 132. The inner tube 130 is also positioned in the outer tube 132 with the support member housing 226 being positioned adjacent the end of the outer tube 132. An end 227 of the outer tube 132 is seated within the actuation section 118 of the gearbox housing 114. The guide feature 216 engages with a slot 236 formed on the slotted rail 234. When the motor 104 is activated, the lead screw 134 will rotate within the inner tube 130, and the nut 218 and guide feature 216 will advance within the slot 236 to advance the inner tube 130 outwardly from the outer sleeve 132, as shown in FIG. 4B. The support sleeve 224, which remains disposed within the outer sleeve 132 when the inner tube 130 is in its extended position, provides for structural support when the inner tube 130 is in its extended position to prevent actuator assembly 100 failures when the extended position experiences lateral loading from wind and other environmental forces acting on the tracker system 10. In one exemplary arrangement, the guide feature 216 is prevented from traveling a predetermined distance from the end of the support member cover 228 to provide an overlap section 238 (FIG. 4B) to address lateral loading from wind and other environmental conditions when the inner tube 130 is in the extended position. In one exemplary configuration, the overlap section 238 is approximately 6 inches long. A pair of limit switches 239 serve to limit the stroke length of the inner tube 130.

Figure 5:
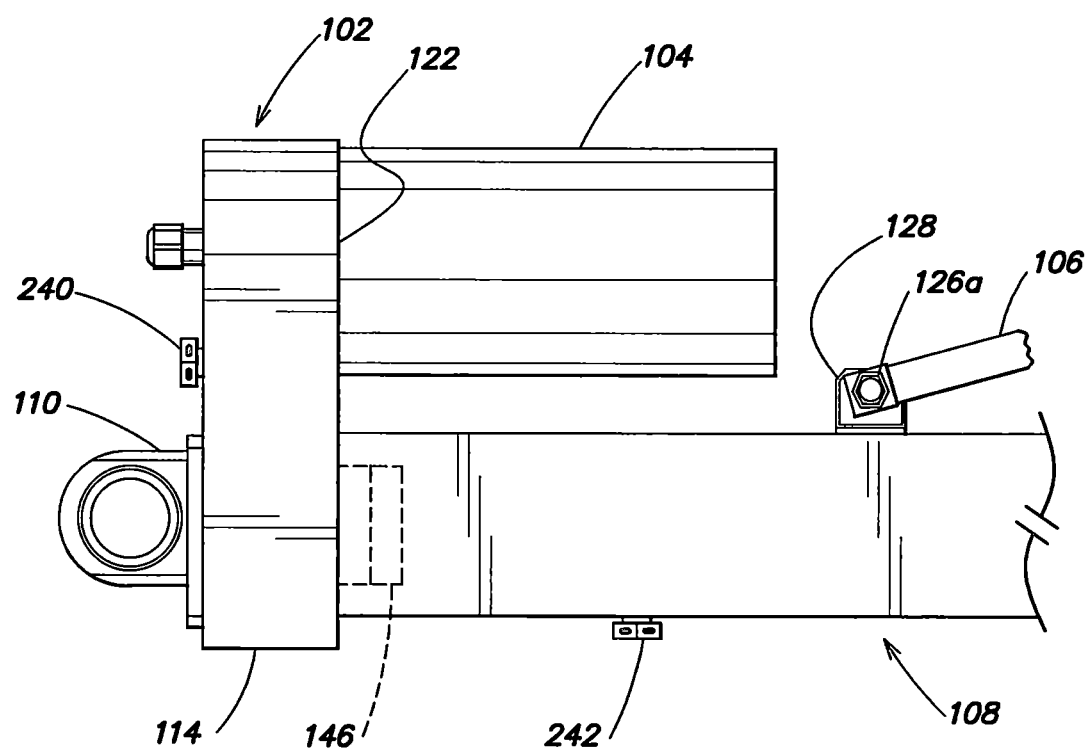
FIG. 5 is an enlarged side elevational view of a motor end of the actuator assembly of FIG. 1.
Figure 7:
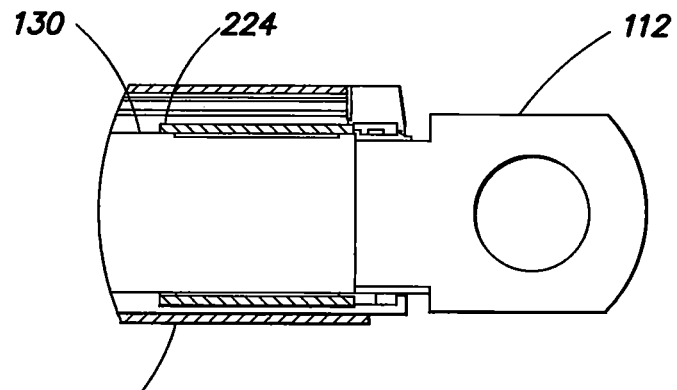
FIG. 7 is a partial cross-sectional view of a distal end of the actuator assembly.
Figure 8:
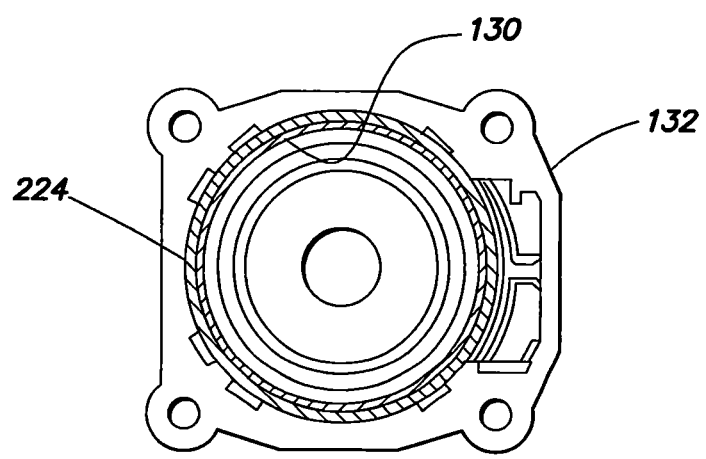
FIG. 8 is an end view of the distal end of the actuator assembly.

Referring to FIG. 5, extending through the gearbox cover 116 is a first two-way air vent 240. A second two-way air vent 242 is disposed through the gearbox housing 114, but spaced away from the thrust bearings 146, downstream of the motor 104. In one exemplary arrangement, the second air vent 242 is spaced at least 3 inches from the thrust bearings 146. In this manner, a vacuum generated by the operation of the thrust bearings 146 will prevent water from being drawn into the gearbox housing 114, even if submerged in water. Both the air vents 240, 242 also permit condensation to escape from the gearbox housing 114, thereby reducing the deterioration of the components within the gearbox assembly 102.

It will be appreciated that the actuator system and its components described herein have broad applications. The foregoing embodiments were chosen and described in order to illustrate principles of the apparatuses as well as some practical applications. The preceding description enables others skilled in the art to utilize apparatuses in various embodiments with various modifications as are suited to the particular use contemplated. In accordance with the provisions of the patent statutes, the principles and modes of operation of this disclosure have been explained and illustrated in exemplary embodiments.

It is intended that the scope of the present methods and apparatuses be defined by the following claims. However, it must be understood that this invention may be practiced otherwise than is specifically explained and illustrated without departing from its spirit or scope. It should be understood by those skilled in the art that various alternatives to the embodiments described herein may be employed in practicing the claims without departing from the spirit and scope as defined in the following claims. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future examples. Furthermore, all terms used in the claims are intended to be given their broadest reasonable constructions and their ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary. It is intended that the following claims define the scope of the invention and that the method and apparatus within the scope of these claims and their equivalents be covered thereby. In sum, it should be understood that the invention is capable of modification and variation and is limited only by the following claims.

What is claimed is:

1. An actuator assembly, comprising:
    a gearbox assembly including gearbox housing and a gearbox cover, the gearbox housing defining an internal chamber for receiving a gear assembly;
    a motor mounted to the gearbox housing and operatively connected to the gear assembly;
    a lead screw operatively attached to the gear assembly and mounted inside an inner tube;
    a thrust bearing assembly disposed between the gear assembly and the lead screw, within the gearbox housing, with a portion of a thrust bearing nut being positioned within the thrust bearing assembly;
    a castle nut engaging against the thrust bearing nut, the castle nut including at least one groove member formed in an end face thereof;
    a locking washer having at least one cooperating tab element that is sized and shaped to be received within the groove member of the castle nut; and wherein the inner tube is mounted within an outer tube for linear movement with respect to the outer tube.

2. The actuator assembly of claim 1, wherein the castle nut includes a plurality of grooves that are spaced apart equi-distance from one another.

3. The actuator assembly of claim 2, wherein the locking washer includes a plurality of cooperating tab elements that are spaced apart equi-distance from one another.

4. The actuator assembly of claim 1, wherein the gearbox cover further includes a two-way air vent disposed therethrough.

5. The actuator assembly of claim 1, wherein the gearbox housing further includes a second two-way air vent disposed therethrough.

6. The actuator assembly of claim 5, wherein the second two-way air vent is spaced from the thrust bearing assembly, downstream of the motor.

7. The actuator assembly of claim 1, further includes a sealing gasket positioned between the gearbox housing and the gearbox cover, along an inner periphery thereof.

8. The actuator assembly of claim 7, wherein the gearbox cover includes a groove that is spaced inwardly from an outer edge of an outer periphery of the gearbox cover, wherein the groove has a defined depth and width that is less than the height and thickness of the sealing gasket when in an uncompressed configuration such that when the gearbox cover and the gearbox housing are joined, the sealing gasket is compressed within the groove, while maintaining a seal between the gearbox cover and the gearbox housing.

\* \* \* \* \*